United States Patent
McBagonluri et al.

(10) Patent No.: US 8,065,118 B2
(45) Date of Patent: Nov. 22, 2011

(54) METHOD FOR ANATOMICALLY AWARE AUTOMATIC FACEPLATE PLACEMENT FOR HEARING INSTRUMENT DESIGN

(75) Inventors: Fred McBagonluri, East Windsor, NJ (US); Raquel Calvachi, Linden, NJ (US); Luis Calvachi, legal representative, Linden, NJ (US)

(73) Assignee: Siemens Hearing Instruments Inc., Piscataway, NJ (US)

( * ) Notice: Subject to any disclaimer, the term of this patent is extended or adjusted under 35 U.S.C. 154(b) by 802 days.

(21) Appl. No.: 11/872,748

(22) Filed: Oct. 16, 2007

(65) Prior Publication Data
US 2009/0099677 A1   Apr. 16, 2009

(51) Int. Cl.
*G06F 7/60* (2006.01)
*G06K 9/00* (2006.01)
*G06T 15/00* (2006.01)

(52) U.S. Cl. .............................. 703/2; 382/128; 345/419
(58) Field of Classification Search ...... 703/2; 382/128; 345/419
See application file for complete search history.

(56) References Cited

U.S. PATENT DOCUMENTS
7,328,080 B2 * 2/2008 Fu et al. ........................ 700/118
7,605,812 B2   10/2009 McBagonluri et al.
2002/0196954 A1  12/2002 Marxen et al.
2004/0071305 A1 *  4/2004 Frederiksen ................... 381/312
2004/0107080 A1 *  6/2004 Deichmann et al. .............. 703/6

FOREIGN PATENT DOCUMENTS
WO   2004/105432 A2   12/2004

OTHER PUBLICATIONS

Brennecke, et al., "3D Shape Matching Using Skeleton Graphs," Simulation and Visualization, 2004, pp. 1-12.*
Slabaugh et al., 3D Shape Modeling For Hearing Aid Design, Sep. 2008, IEEE Signal Processing Magazine, pp. 98-102.*
Alexander Zouhar, Tong Fang, Gozde Unal, Greg Slabaugh, Hui Xie, Fred McBagonluri, entitled "Anatomically-Aware, Automatic, and Fast Registration of 3D Ear Impression Models", Third International Symposium on 3D Data Processing, Visualization, and Transmission (3DPVT'06), 2006, pp. 240-247, University of North Carolina, Chapel Hill, USA.

* cited by examiner

*Primary Examiner* — Paul Rodriguez
*Assistant Examiner* — Juan C Ochoa
(74) *Attorney, Agent, or Firm* — Francis G. Montgomery (57) ABSTRACT

A method is provided for automatically determining the position of and placing a faceplate assembly on a hearing instrument shell that takes into account patient anatomical features. These anatomical features of the shell are used as landmarks for ensuring that the final position of the faceplate on the hearing instrument is optimized both in terms of esthetics and increased comfort. The protocols defined herein take advantage of the intrinsic features of the human ear anatomy and the geometry of the electronic components to ensure that design and manufacturing of ITEs are optimized for efficiency and the process can be completely automated to ensure consistence and practice reproducibility.

19 Claims, 12 Drawing Sheets

METHOD FOR ANATOMICALLY AWARE AUTOMATIC FACEPLATE PLACEMENT FOR HEARING INSTRUMENT DESIGN

BACKGROUND

The present invention is directed to a method for automating the placement of a faceplate in a hearing instrument using rule-based protocols based on characteristic shell features and collision detection protocols.

Figure 1A:
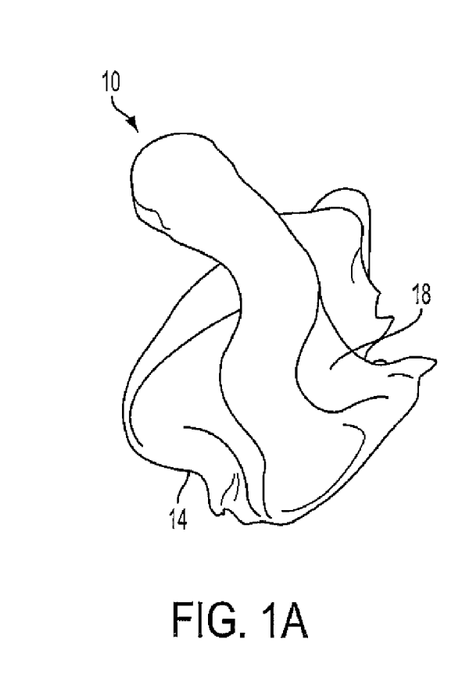
FIGS. 1A-C are pictorial illustrations of the basic impression feature definitions for a faceplate datum plane.
Figure 1B:
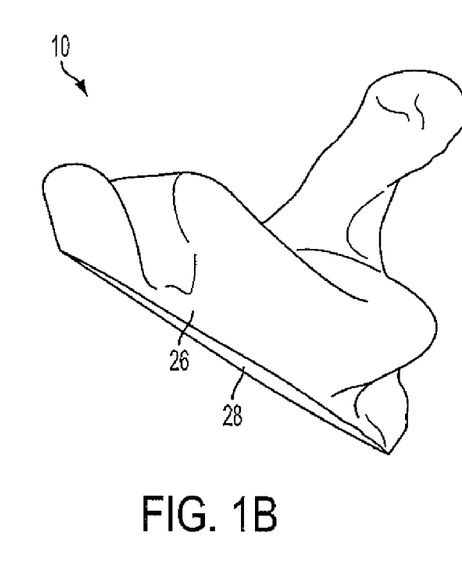
Figure 1C:
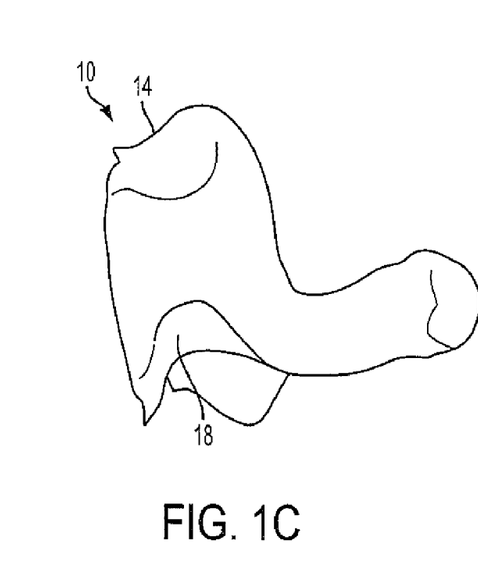
Figure 2A:
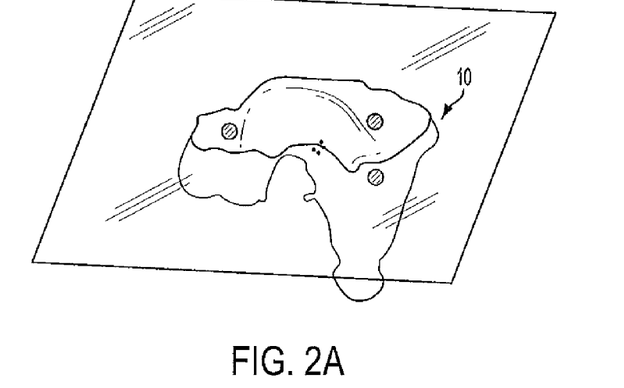
FIG. 2A is a pictorial illustration showing definitive landmarks for a datum plane of an impression.
Figure 2B:
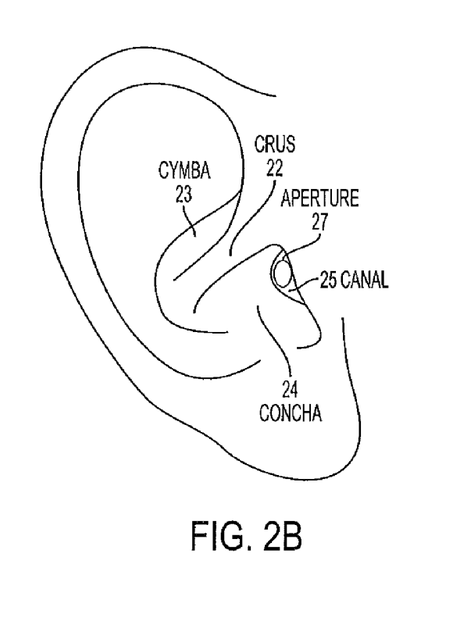
FIGS. 2B & C are pictorial illustrations showing the parts of the ear and corresponding parts of the hearing aid impression.
Figure 2C:
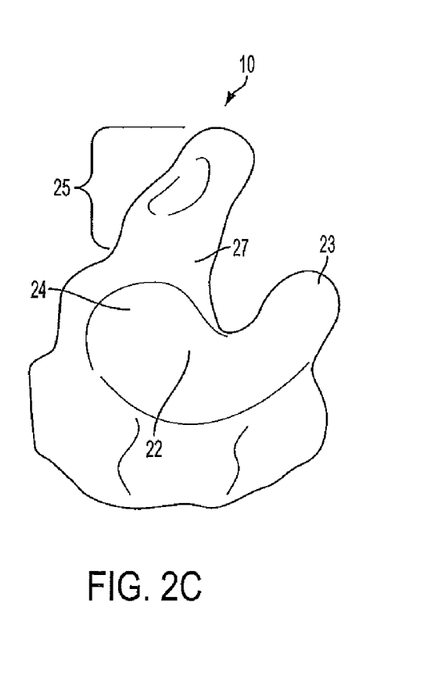

The envisioned faceplate placement protocols use impression features obtained from a mold 10 (FIGS. 1A-1C) of the ear canal meatus and external ear. Using principal component analysis (PCA) techniques, characteristic features of the impression, such as the tragus 18, anti-tragus 14, and anti-helix 26 are clearly demarcated. Furthermore, optimization techniques such as genetic algorithm, stochastic optimization, memetic algorithm, and/or general combinatorial optimization algorithms are also key algorithmic candidates for the determination of impression features within wide demographic population. FIG. 2A illustrates definitive landmarks for a datum plane of an impression 10. FIGS. 2B and 2C illustrate corresponding portions of a human ear and impression made therefrom.

A typical in-the-ear (ITE) hearing instrument comprises the following key electronic components:
- A microphone that picks up the sound and transfers it to the amplifier;
- A receiver that makes the sound louder and helps correct any sound distortion;
- A volume control that adjusts loudness;
- A battery that supplies the power; and
- A push button that toggles between programmed settings.

In a traditional hearing aid design, the shelf 10' of the hearing aid undergoes a number of manual and labor-intensive operations in a multi-process procedure. These processes occur in order to reduce a raw impression 10 to a prescribed hearing aid instrument.

One stage of this multi-process procedure is the interactive placement of the faceplate. This is initiated virtually in order to a priori determine whether the prescribed device can be built for the given impression. Furthermore, the final position of the faceplate is considered that which is most optimum, anatomically more comfortable, and collision free (meaning that it does not interfere with electronic components or other parts of the shell).

All hearing instruments have electronic components, such as batteries, a microphone, a push button(s), a volume control, hybrids, programming contacts, and a faceplate which serves as a carrier for these components. Due to the anatomy of the ear canal, some protruding electronic components, such as the pushbuttons and volume controls, have to be positioned such that they so not come into contact with the patient's ear. Hence significant effort is undertaken during the design phase of the casing of the hearing instrument to ensure that patient comfort is accounted for.

SUMMARY

The present invention is directed to ensuring that the placement of the faceplate and its attendant components is automated to ensure efficiency in the design process, adapting to the anatomical complexity of the patient's ear, and ensuring a collision-free component-shell interaction.

Accordingly, in various embodiments of the invention, a method is provided for automatically positioning a faceplate assembly on a hearing instrument shell, comprising: automatically determining at least one anatomical feature of the hearing instrument shell based on a 3-D data representation of the shell; automatically determining a position of the faceplate assembly on an outer surface of the hearing aid shell based on the at least one anatomical feature; ensuring that the position of the faceplate assembly does not cause a collision (collision detection) with the hearing instrument shelf or other hearing aid components; and outputting the position of the faceplate assembly at an output of a computer.

To accomplish this, faceplate placement protocols of the five key types of in-the-ear instrument are outlined below. Furthermore, algorithm-based protocols that implement this automation will be highlighted for each hearing instrument type. An automated method for hearing aid faceplate placement is provided that is implemented with a computer and also, at the same time, takes into account the physiological shape of the ear.

These may be implemented on a general purpose computer having a processor that executes code contained with software modules for implementing the algorithms. The computer has a memory for holding the software modules during execution and a permanent storage for storing the software modules when the computer is not powered on. The computer has a user interface with an input (e.g., keyboard, mouse), and an output (e.g., display screen). The computer itself comprises a network connection and other forms of inputs and outputs. The software modules can be stored on a computer readable media.

DESCRIPTION OF THE DRAWINGS

The invention is described in detail below with reference to various preferred embodiments as illustrated in the figures and appertaining following description.

DETAILED DESCRIPTION OF THE PREFERRED EMBODIMENTS

According to various embodiments of the invention discussed below, the placement and integration of the faceplate is automatically performed. Computer software running on a general purpose computer simulates the faceplate placement and ensures that the final position of the faceplate results in the optimal collision free position. Accordingly, the software ensures that the final orientation is based on defined rules for a particular shell type.

Figure 3A:
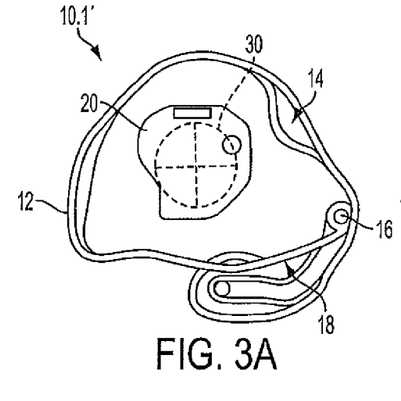
FIGS. 3A & B are pictorial drawings illustrating faceplate placement in a hearing aid with a full shell (FS) design.
Figure 3B:
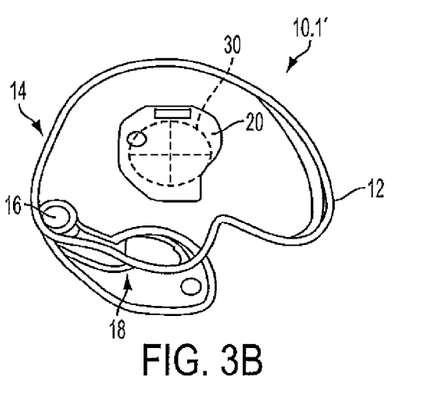
Figure 4A:
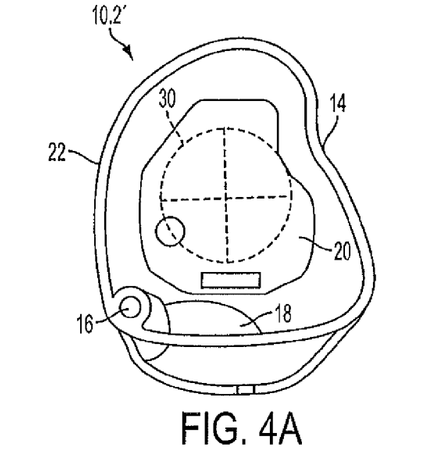
FIGS. 4A & B are pictorial drawings illustrating faceplate placement in a hearing aid with a half shell (HS), canal (CA), and mini-canal (MC) designs.
Figure 4B:
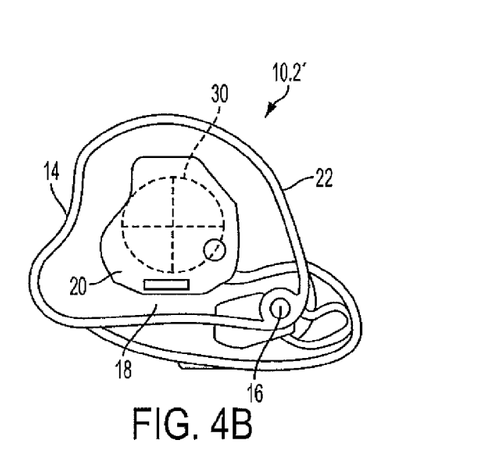
Figure 5A:
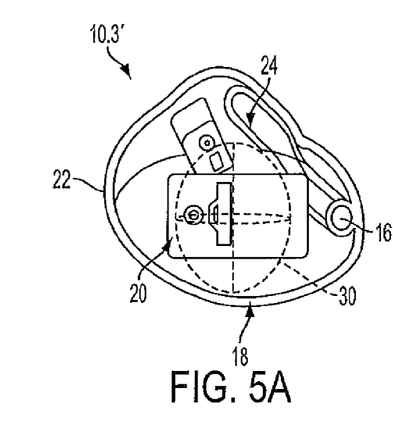
FIGS. 5A & B are pictorial drawings illustrating faceplate placement in a hearing aid with a completely-in-canal (CIC) design.
Figure 5B:
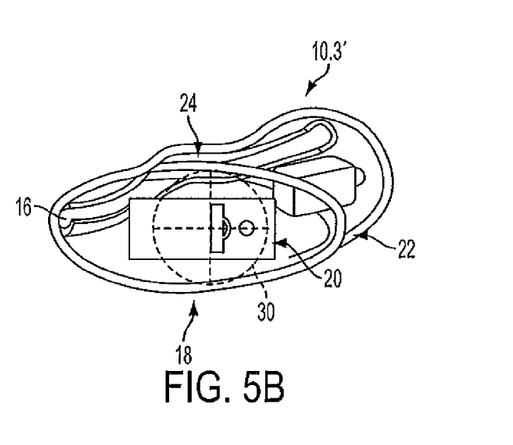

FIGS. 3A-5B illustrate anatomically aware faceplate orientation and placement during the design of a custom hearing instrument according to different shell 10' types. FIGS. 3A and 38 illustrate a full shell (FS) design 10.1'. FIGS. 4A and 4B illustrate half shelf (HS), canal (CA), and mini-canal (MC) designs 10.2'. Finally, FIGS. 5A and 58 illustrate a completely-in-canal (CIC) design 10.3'. Each of the figures illustrate the location of various features of the hearing aid shell 10'. Accordingly, the features of the helix 12, anti-tragus 14, vent 16, tragus 18, microphone 20, crus 22 and concha bowl 24 can be seen. A faceplate and attendant electronic controls orientation implemented according to these embodiments of the invention ensure a comfortable and optimum control.

Battery Door Placement

Figure 6:
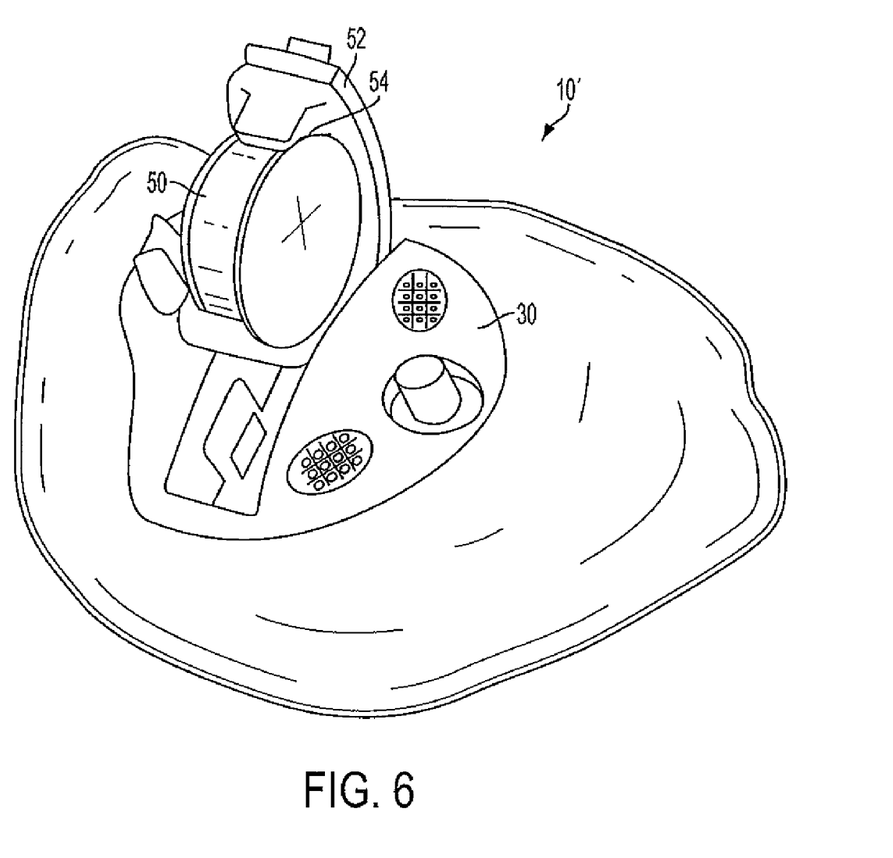
FIG. 6 is a pictorial illustration showing a typical semi-modular integrated shell with an opened battery door.

FIG. 6 illustrates a typical semi-modular integrated shell 10' with an opened battery door 52 having a battery 50 in a battery compartment 54.

For an in-the-ear (ITE) device 10.1', the battery door 52, which forms part of the electronic module, is positioned such that it opens away from the tragus 18. But for HS, CA and MC designs 10.2', the battery door 52 is positioned such that it opens towards the tragus 18. In the CIC design 10.3', the battery door 52 is positioned so that it opens away from the vent hole 16. For each of these device types, the determination of the aforementioned landmarks is key to ensuring that the faceplate 30 is anatomically well-positioned.

Collision Detection

The software is designed to ensure that collision detection is facilitated between merge surfaces and the components of the hearing aid. An overall flowchart 100 showing the context of the collision detection can be seen in FIG. 7. What is significant here is that such automated placement protocols for hearing instrument faceplate placement is implemented in a 3-dimensional modeling software system.

Figure 7:
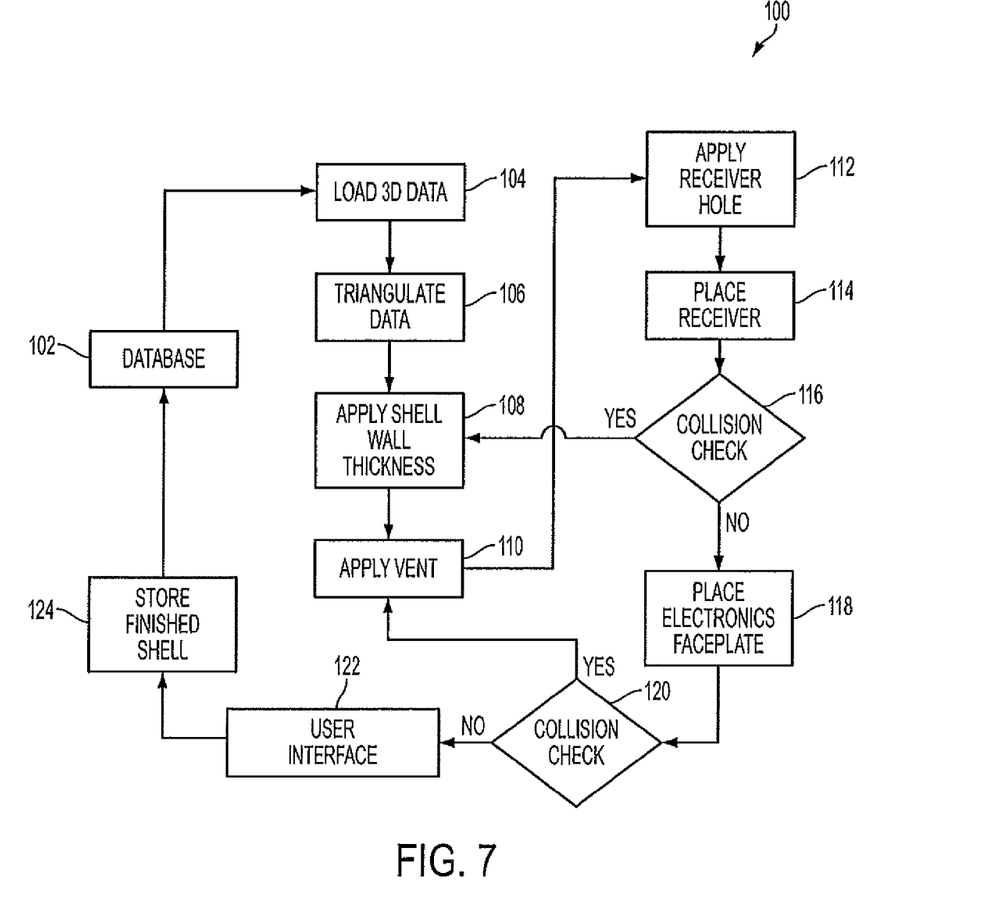
FIG. 7 is a flowchart illustrating shell design protocols including sequential collision verification, constraint identification, and shell size optimization protocols.

3D data representing the shell is loaded 104 from a database 102. The system can receive a file formatted as a Standard Tessellation Language (STL) or 3D-point cloud as input from any of commercially available 3-D scanner systems, such as, Cyberware, Minolta and iSCAN, or in other decodable proprietary and non-proprietary 3D readable format. Furthermore, the corresponding faceplate geometry can be provided in STL format as well.

Vertices of intersecting triangles on the faceplate 30 and the merge surfaces on the shell 10' are computed algorithmically 106. Various elements are applied to the design such as the shell wall thickness 108, the vent 110, receiver hole 112, and receiver 114.

At this point, a collision check 116 is performed. An algorithm may utilize a "collision responses", which simply may be likened to a repulsive force that avoids continuous collision between intersecting triangles. Such algorithms include close relative distance computation algorithms where intersecting triangles are repulsed. Additionally, traditional collision detection protocols, which return a true/false Boolean value as an indication of a geometric interaction of triangles may be utilized for this.

In geometric programming, collision detection algorithms are classified into two distinct groups: a) feature based algorithms, and b) hierarchical bounding volume algorithms. This classification of collision detection protocols is based solely on the distinct advantages and drawbacks associated with each protocol. In hearing instrument design, a collision is checked during component placement to ensure that the device size is optimized and the placement of the components do not impact the anatomical structure of the ear impression.

Feature based algorithms, in general, are better suited for exploiting temporal coherence in the model. In feature based algorithms, infinitesimal motions of the simulated objects require minimal correction to determine the new closest feature pairs. Furthermore, in feature based collision protocols, the object is generally segmented into points, line segments and facets. Such segmentation ensures that each of these discrete entities can be tagged and monitored with the simulation protocols.

Hierarchical bounding volume algorithms require miniscule underlying geometric models of the simulating object(s). In general, non-convex objects, polygon soups, are easily handled by hierarchical bounding volume approaches.

In addition to the standard collision protocols, these protocols can implement a configurable penetration index. This index determines:

1. Which electronic components are allowed to interact freely without evoking collision; and 2. What penetration depth is allowed between the meshed surfaces of the electronic components before collision detection is triggered.

In the collision check step 116, if a collision is detected, the steps associated with applying the shell wall thickness 108, vent 110, receiver hole 112, and receiver 114 are performed again, and the check 116 is repeated.

If there is no collision up to this point, then positioning of the electronics faceplate 118 is performed, and a subsequent collision check 120 follows. If a collision is detected at this point, then the software repeats the preceding steps from the point of applying the vent 110-120.

Note that the vent and receiver are optimizable parameters that exist within the art today. The resolution of these constraints is not the focus here, and any algorithm developed to optimize the faceplate process has to be adaptive enough to resolve these constraints.

If there is no collision, then a verification may be performed via a user interface 122. The user can manipulate the STL file using an input device such as a mouse, joy stick, spaceball, or the like. In a preferred embodiment, the initial placement of the faceplate is automatically implemented using feature recognition and the device based rule-based protocols. However, although FIG. 7 and the above description shows a utilization of the user interface 122 after the later collision check 120, the user interface 122 can clearly be utilized at any stage during the process for either verification or control purposes.

The implemented collision feedback mechanism can provide a visual indicator on the user interface 122 when a collision is present. For example, a collision between the faceplate 30 and electronic components with shell 10' might be displayed in a configurable color that differs from that used for the faceplate 30, other components, and shell 10'. The color display can be automatically highlighted by the system to show the user where the interaction between the components occur. Of course, any visual indicia, such as shading or other visual attribute, such as flashing, etc. may be utilized.

As illustrated in FIG. 7, when a design has been completed with no collisions amongst the elements, the design may be stored 124 in the database 102.

Human Interactive Protocols

In the interactive implementation, the user can be provided with a way to select corresponding features on the impression 10 and on the faceplate/electronic module 30. Using the selected landmarks as inputs, the software can then align the faceplate/electronic module 30 with the impression 10. Furthermore, the software can further provide the user with the ability to store the coordinates of the landmark data in the database 102. This stored information can serve as a basis for comparative analysis of the system landmark computations against human assisted data acquisition.

Computer-Aided Automated Protocols

In the automated protocols, the software can use definitive features acquired in real time from the specific impression 10. This can be accomplished using techniques, hardware, formulae, and procedures described in U.S. patent application Ser. No. 11/612,616, entitled "Intelligent Modeling Method and System for Earmold Shell and Hearing Aid Design", issued as U.S. Pat. No. 7,605,812 on Oct. 20, 2009, herein incorporated by reference. The system can then define the corresponding datum planes along the faceplate/module 30. FIGS. 3A-5B illustrate a comprehensive overview of the anatomically-aware faceplate placement on the hearing aid instrument for different hearing aid designs.

Figure 8:
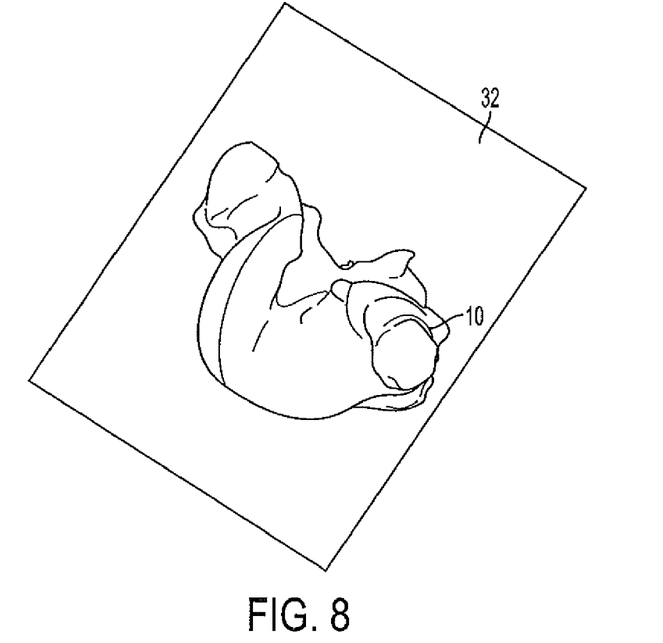
FIG. 8 is a pictorial illustration showing a hearing instrument impression with a defined datum plane along the tragus, anti-tragus and anti-helix.
Figure 9:
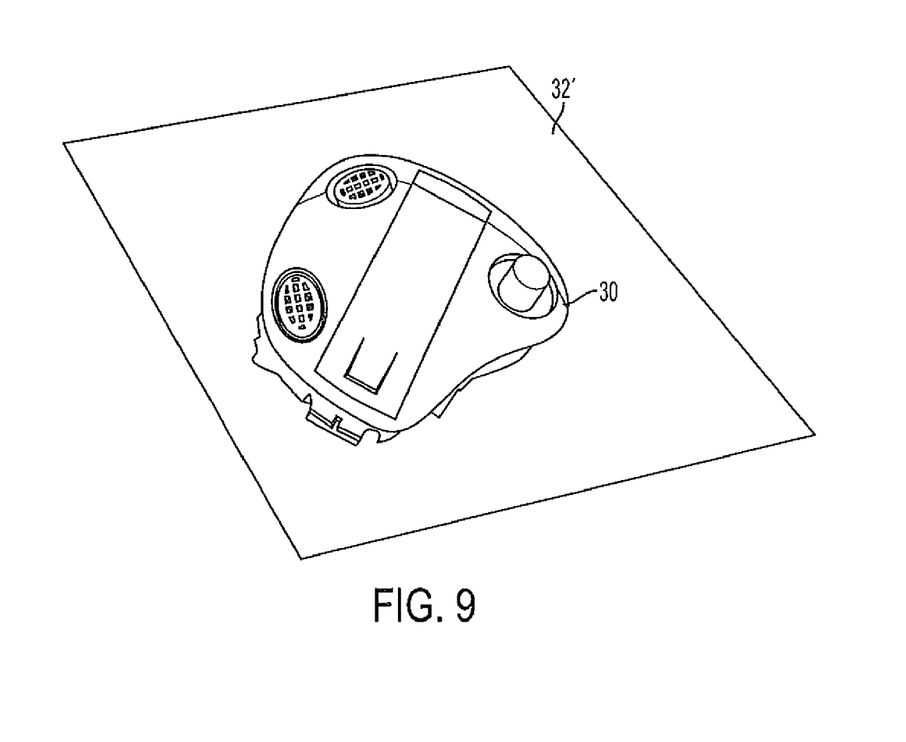
FIG. 9 is a pictorial illustration of a typical hearing instrument electronic module comprising a trimmers, push button, battery door, and defined datum plane.
Figure 10:
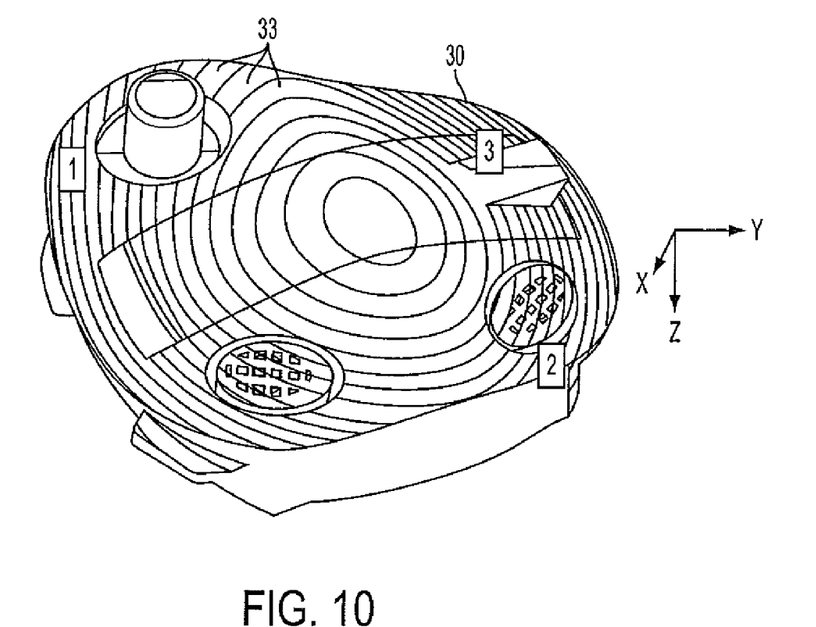
FIG. 10 is a pictorial illustration of a scanned electronic module showing key orientation mark points.
Figure 11:
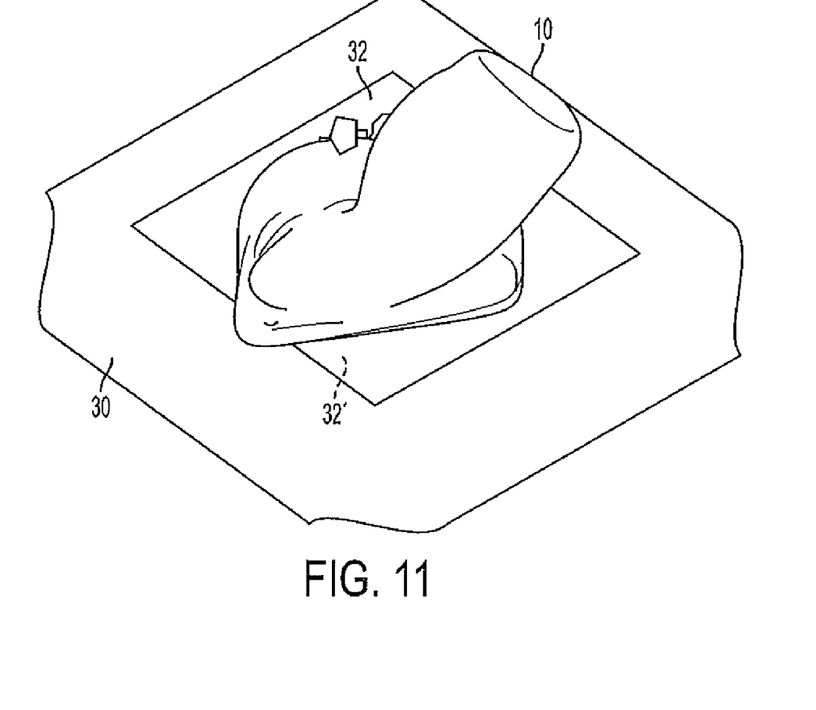
FIG. 11 is a pictorial illustration showing the synchronization of datum planes of the faceplate/electronic and shell impression.
Figure 12:
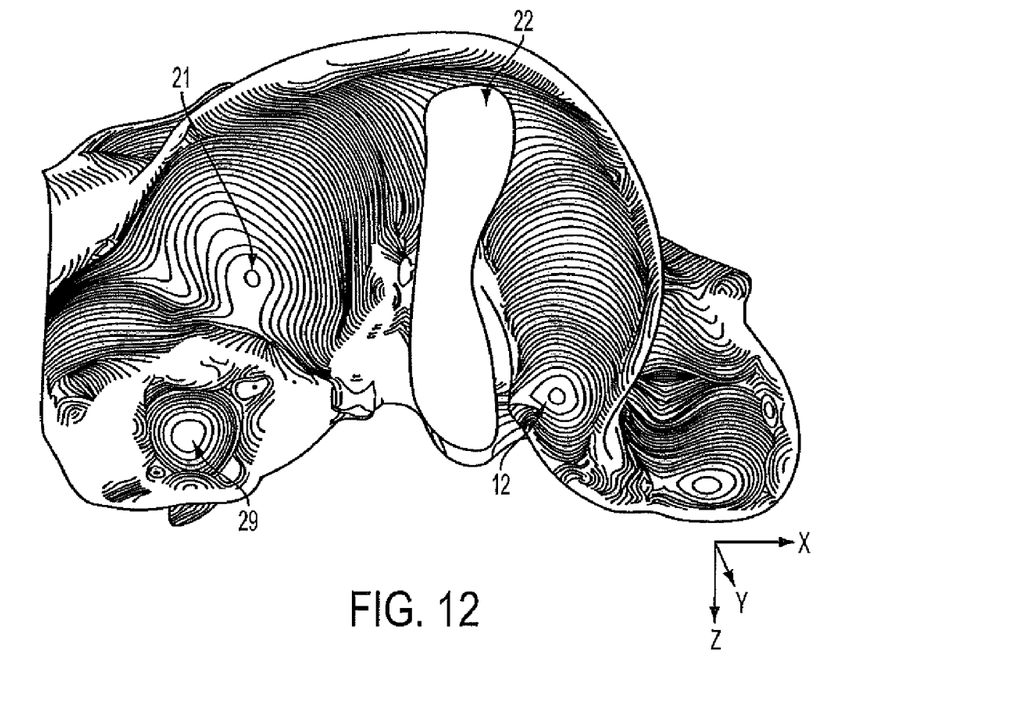
FIG. 12 is a pictorial illustration of a typical impression with landmark features of hearing instrument.

Automatic Faceplate Placement Protocols for In-The-Ear (ITE) Hearing Instruments To facilitate optimum and automated faceplate 30 placement on the hollowed end of the shell 10', the following protocols may be implemented in a three-dimensional geometric-based software system. The protocols under this heading relate to ITE hearing instruments. This software system should have the capability to execute the following protocols, at least in some combination:

a) defining a relative coordinate system with origin at the centroid or center of mass of the faceplate/electronics module 30;

b) generating a shell datum plane 32 (FIG. 8) along a hollowed end 28 (FIG. 1B) of the impression 10 using the focal points of the tragus 18, anti-helix 26, and anti-tragus 14 as reference points for planar definition.

c) generating a corresponding horizontal faceplate assembly datum plane 32' on the faceplate/electronics module 30 as shown in FIG. 9 with the center of the faceplate assembly datum plane 32' at the centroid or center of mass of the faceplate/electronic module 30 assembly. The horizontal faceplate assembly datum plane 32' should be defined along a contour slice 33 (FIG. 10) of the electronic module 30 whose center coincides with the centroid of the faceplate/electronic module 30 assembly. The contour slices 33 are defined by planes that are generally perpendicular to a vector that perpendicularly intersects the bottom of the tragus 18 trough. In order to determine the faceplate assembly datum plane 32', using PCA, the variation of the parametric contour sizes is monitored. The first largest contour encountered serves as the basis for the definition of the faceplate/electronic datum plane. In other words, contour areas for contour slices 33 for the faceplate/electronic module 30 are determined at predefined intervals 1, 2, . . . N in an X-axis direction towards the trough of the tragus 18. When a slice 33 is detected having a smaller area than its predecessor slice 33, then the predecessor slice 33 is determined to be the first largest contour encountered;

d) automatically aligning the faceplate assembly datum planes 32' of the electronic/faceplate 30 and the shell datum plane 32 of the impression 10 shown in FIG. 11;

e) ensuring that the X-axis of the faceplate/electronic module 30 is directed at the trough of the tragus 18;

f) ensuring that the geometric centerline 35 of the portion of the shell 10' below the aperture 27 and opening out to the external meatus of the impression coincides with the geometric centroid of the faceplate/electronic module 30; and g) ensuring that the electronic faceplate module 30 is collision free and furthermore that the battery 50 does not collide with the concha peak 21 as shown in FIG. 12.

Figure 15:
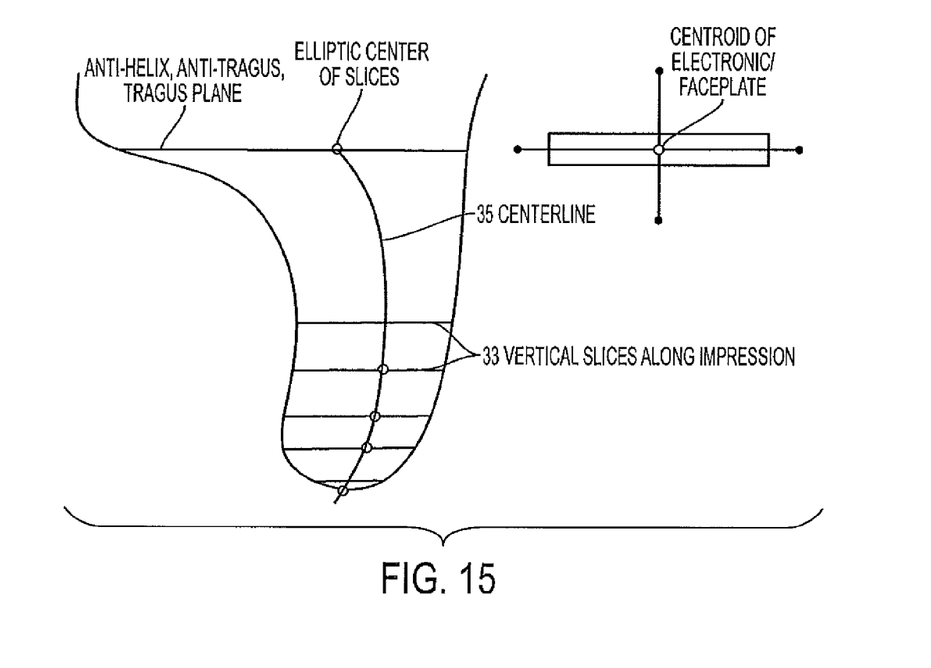
FIG. 15 is a pictorial illustration of a sliced impression and faceplate/electronics showing an elliptic center of the impression and the centroid of the faceplate/electronics.

As illustrated in FIG. 15, the centerline 35 is not important in the alignment protocols since the center of the plane generated along the anti-helix, tragus and anti-tragus provides the coincident point required to align the centroid of the faceplate/electronics.

Figure 13:
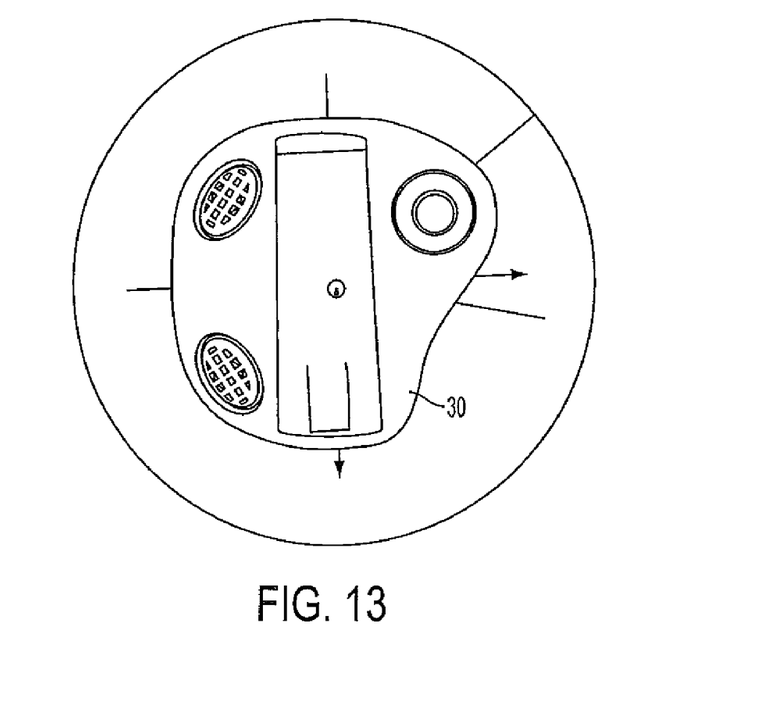
FIG. 13 is a pictorial illustration of the relative axis location on the faceplate/electronic module.
Figure 14:
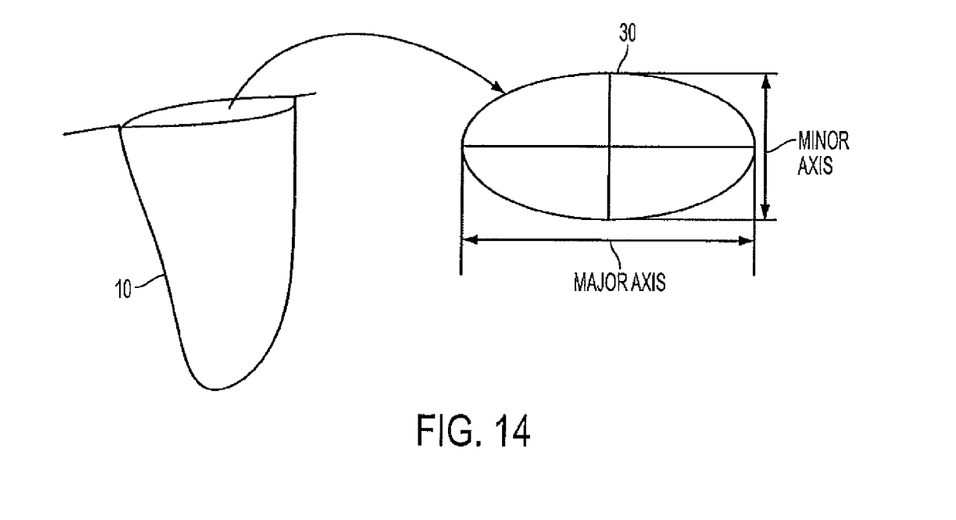
FIG. 14 is a pictorial line drawing illustrating the alignment of datum planes of the faceplate and shell.
Figure 16:
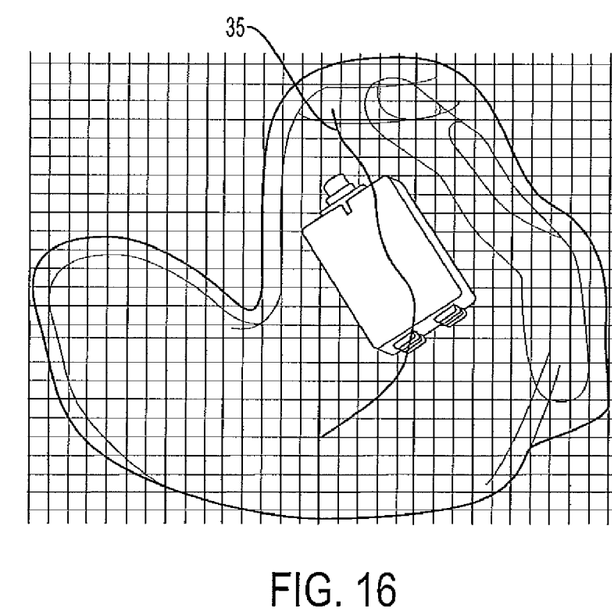
FIG. 16 is a pictorial illustration of a centerline in a typical ITE hearing aid shell.
Figure 17:
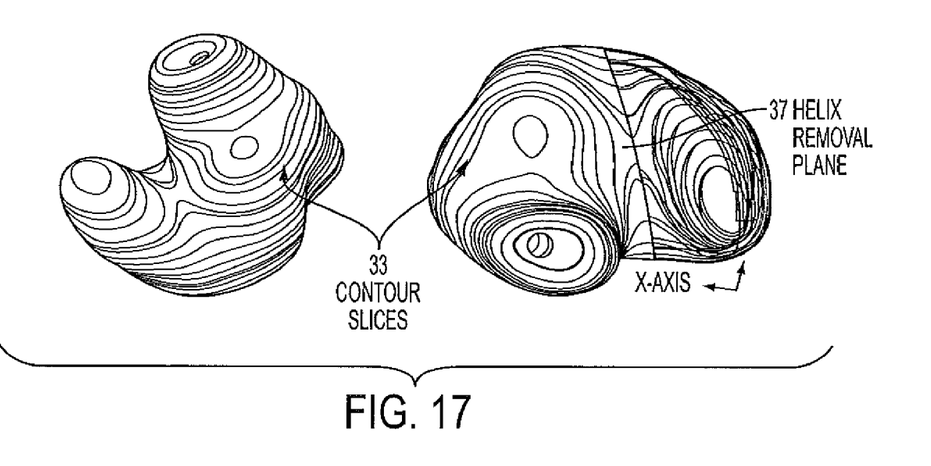
FIG. 17 is a pictorial illustration showing the reference helix contour/plane.

Automatic Faceplate Placement Protocols for Canal (C), Half-Shell (HS), and Mini-Canal (MC) Hearing Instruments For the canal (C), half-shell (HS), and mini-canal (MC) hearing instruments, the steps (a)-(g) described above can be implemented with the following exceptions:

a) the centerline 35 of the shell 10' can be computed without the helix 12 portion. The centerline 35 is illustrated in FIG. 16. This section may be eliminated by a cutting plane inserted along the crus 22 of the impression 10 as illustrated in FIG. 12 and FIG. 17; FIG. 17 shows an impression 10 with the helix removed. The computation of the centerline 35 is done as par of the total feature computation of undetailed impression using the same feature set as that of the ITE. In the case of CA, HS and MC when the helix is removed, the centerline is recomputed based on the slicing methodology shown in FIG. 16. Thus, the centerline for these shell types intersects the original anti-tragus, tragus and anti-helix plane defined for the undetailed impression. An elliptic center, which is generally the intersection of the centerline and the based plane (anti-tragus, tragus and anti-helix plane) may be slightly shifted from the elliptic center of the ITE.

b) the final position of the faceplate/electronic module 30 is rotated 180° along the Z-axis of the faceplate/electronic module 30 (FIG. 13); and c) the system ensures that the crus plane defined between the valley of concha and the helix ridge (FIG. 17) does not collide with the faceplate geometry by providing a configurable minimum distance of separation, Automatic Faceplate Placement Protocols for Completely-In-The-Canal (CIC) Hearing Instrument For the completely-in-canal (CIC) design, the following procedure may be used:

a) slicing the shell vertically using standard Principal Component Analysis (PCA) protocols (see Alexander Zouhar, Tong Fang, Gozde Unal, Hui Xie, Greg Slabaugh and Fred McBagonluri, Anatomically-aware, Automatic, and Fast Registration of 3D Ear Impression Models, Third International Symposium on 3D Data Processing, Visualization and Transmission, University of North Carolina, Chapel Hill, USA, Jun. 14-16, 2006, herein incorporated by reference).

b) extracting the largest contour at the hollowed end of the shell impression 10. In the case of a CIC device, this largest contour is the same as the aperture contour of the impression;

c) computing the centerline 35 of the canal 25, which should intersect the aperture 27 plane at the elliptic center of the impression 10 (this is the same as coordinates at the intersection of the major and minor axes of the aperture 27 contour);

d) computing the major and minor axes of the aperture 27 contour. This is required because the final position of the faceplate/electronic module 30 is along the major axis of the impression 10.

e) computing the corresponding major and minor axes of the faceplate 30 geometry, as shown in FIG. 14; This is computed along the centroid of the faceplate f) aligning the centroid of the faceplate/electronic module 30 with the elliptic center of the aperture 27 contour. Note that the centerline 35 is a key attribute of this computation alignment of the faceplate/electronic module 30 to the impression 10. It is updated during a transition from one device type to the other for the same impression. This computation allows the elliptic center to be adapted for each device type.

Note that the elliptic center of the impression and the centroid of the faceplate has to be computed as an initial alignment point. Subsequently, as in the case of the CIC the final position of the faceplate/electronics module 30 is along the longest axis of the aperture 27, which is the major axis. The longest axis of the faceplate/electronics module 30 must be aligned along the major axis of the aperture 27 contour. This may require a final rotation about the elliptic center of the impression 10 which is the principal pivot for the final alignment.

Figure 18:
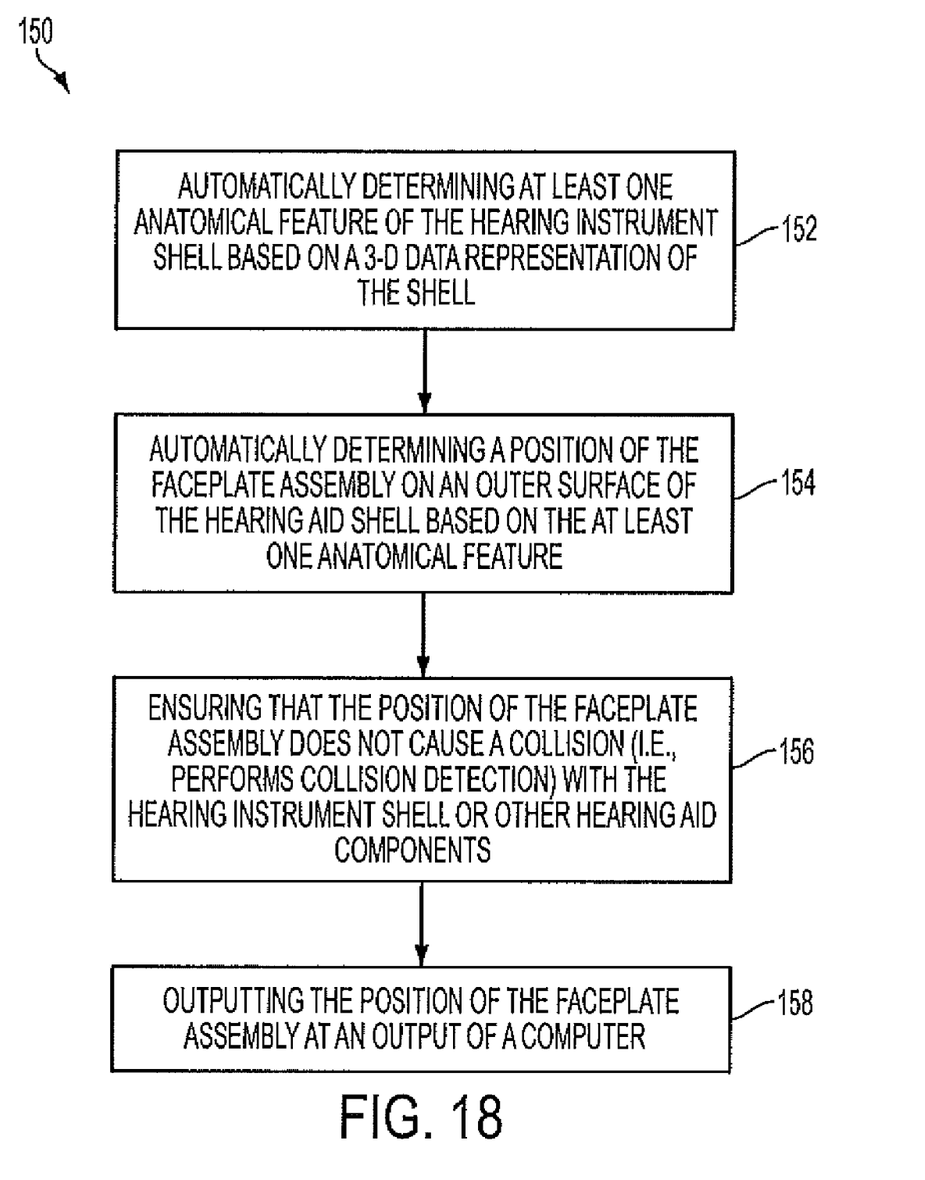
FIG. 18 is a flow chart of a method carried out in accordance with the present invention.

FIG. 18 shows a flowchart summarizing a method 150 for automatically positioning a faceplate assembly on a hearing instrument carried out in accordance with the present invention as described above. The method 150 provides automatically determining at least one anatomical feature of the hearing instrument shell based on a 3-D data representation of the shell (Step 152) and automatically determining a position of the faceplate assembly on an outer surface of the hearing aid shell based on the at least one anatomical feature (Step 154). The method 150 also provides ensuring that the position of the faceplate assembly does not cause a collision (i.e., performs collision detection) with the hearing instrument shell or other hearing aid components (Step 156). The method 150 further provides outputting the position of the faceplate assembly at an output of a computer (Step 158).

Figure 19:
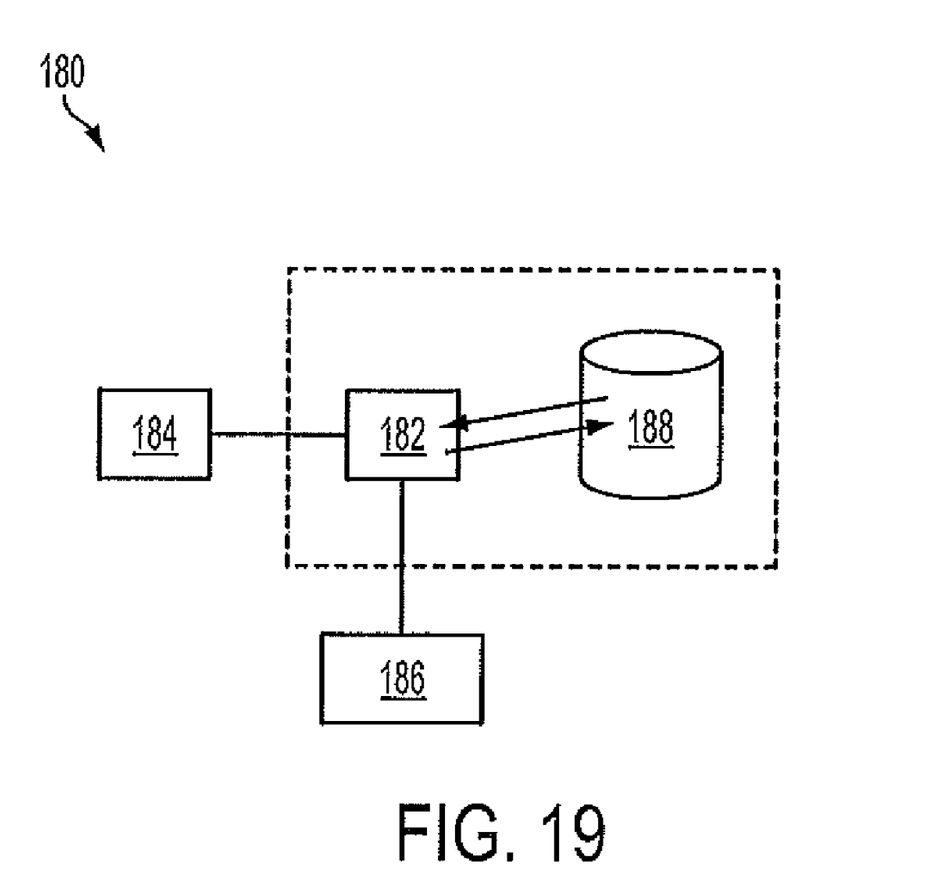
FIG. 19 is a block diagram of a system (simplified) operable in accordance with the present invention.

FIG. 19 is a block diagram of a computer system 180 (simplified) operable in accordance with the present invention for implementing the above method. The computer system 180, or general purpose computer, has a processor 182 and a user interface with an input 184 (e.g., keyboard, mouse), and an output 186 (e.g., display screen, network connection to other devices, such as production systems). The processor 182 executes computer-readable coded instructions contained within software modules for implementing algorithms to carry out the method 150. The system 180 also has a memory 188 for holding the software modules for execution and a permanent storage for storing the software modules when the system 180 is not powered on. The computer system 180 also comprises a network connection and other forms of inputs and outputs. The software modules, and the computer algorithms therein, can be stored on a computer readable media.

In the above described manner, the correct faceplate placement can ensue for a wide variety of hearing aid shapes in an automated manner. For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The word mechanism is used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

TABLE OF REFERENCE CHARACTERS

10 mold/impression
10' hearing aid shell based on mold/impression
10.1' shell for full shell design
10.2' shell for half shell design
10.3' shell for CIC shell design
12 helix
14 anti-tragus
16 vent
18 tragus
20 microphone
21 concha peak
22 crus
23 cymba 24 concha bowl
25 canal
26 anti-helix
27 aperture
28 hollowed end of impression
29 canal tip
30 faceplate/electronics module
30' faceplate orientation
32 datum plan along tragus, anti-tragus, and anti-helix
32' corresponding horizontal datum plane on the faceplatel electronic module
33 contour slice
35 centerline
37 helix removal plane
50 battery
52 battery door
54 battery compartment
100-124 collision determination flow chart and steps
150-158 a method of the present invention flow chart and steps
180-188 computer system for implementing the method of the present invention

What is claimed is:

1. A method for automatically positioning a faceplate assembly on a hearing instrument shell, comprising:
automatically determining at least one anatomical feature of the hearing instrument shell based on a 3-D data representation of the shell, the anatomical feature being selected from the group consisting of a tragus, an anti-tragus, a crux, and a helix;
automatically determining a position of the faceplate assembly on an outer surface of the hearing aid shell based on the at least one anatomical feature;
ensuring that the position of the faceplate assembly does not cause a collision (collision detection) with the hearing instrument shell or other hearing aid components; and
outputting the position of the faceplate assembly at an output of a computer.

2. The method according to claim 1, further comprising:
classifying the hearing instrument shell as being one of: Class A) an in-the-ear (ITE) design; Class B) a canal (C), half-shell (HS) or mini-canal (MC) design; and Class C) completely-in-canal (CIC) design, wherein different sets of placement rules for automatically determining the position of the faceplate assembly are utilized depending on the classification.

3. The method according to claim 2, wherein:
for a Class A design, the method further comprises:
defining a relative coordinate system with its origin at a centroid or center of mass of the faceplate assembly;
generating a shell datum plane along its hollow end utilizing the automatically determined anatomical features tragus, anti-helix, and anti-tragus;
generating a faceplate assembly datum plane having a point corresponding to the centroid or center of mass of the faceplate assembly;
automatically aligning the shell datum plane and the faceplate assembly datum plane;
ensuring that an x-axis of the faceplate assembly datum plane is directed at a trough of the tragus;
ensuring that a geometric centerline of a portion of the shell below its aperture and opening out to an external meatus of the impression coincides with the geometric centroid of the faceplate assembly;
ensuring that the faceplate assembly is collision free;
ensuring that a battery does not collide with a concha peak of the shell; and
adjusting a position of the faceplate assembly if any collisions are detected.

4. The method according to claim 3, wherein generating a faceplate assembly datum plane comprises:
defining a horizontal datum plane along a contour slice of the electronics module whose center coincides with a centroid of the faceplate-electronics module assembly.

5. The method according to claim 4, wherein the contour slice is defined by a plane that is perpendicular to a vector that perpendicularly intersects a bottom of a trough of the tragus.

6. The method according to claim 4, wherein the faceplate assembly data plane is determined, using principal component analysis (PCA), monitoring a variation of parametric contour sizes and selecting a first largest contour encountered to serve as a basis for defining the faceplate-electronics datum plane.

7. The method according to claim 3, wherein:
for a Class B design, the method further comprises:
computing the shell centerline without a helix portion by inserting a cutting plane along a crus of the impression;
rotating the faceplate assembly by 180° along a Z-axis of the faceplate assembly for a final position of the faceplate; and
ensuring that a crus plane defined between a valley of a concha and a helix ridge does not collide with the faceplate assembly geometry by providing a configurable minimum distance of separation.

8. The method according to claim 2, wherein:
for a Class C design, the method further comprises:
slicing the shell vertically using standard Principal Component Analysis (PCA) protocols;
extracting a largest contour at a hollowed end of the shell impression;
computing a centerline of the canal, which intersects an aperture plane at an elliptic center of the impression;
computing major and minor axes of the aperture contour;
computing a corresponding major and minor axes of the faceplate geometry, along a centroid of the faceplate; and
aligning the centroid of the faceplate with the elliptic center of the aperture contour.

9. The method according to claim 1, wherein the collision detection comprises:
loading 3D data representing the shell from a database, creating a 3D working model;
computing vertices of intersecting triangles on the faceplate and merge surfaces of the shell;
applying elements to the 3D working model;
performing a collision check by applying a collision response algorithm.

10. The method according to claim 9, wherein the 3D data is formatted as a standard tessellation language (STL) file or a 3D point cloud.

11. The method according to claim 9, wherein the elements include shell wall thickness, a vent, a receiver hole, and a receiver.

12. The method according to claim 9, wherein the collision check utilizes an algorithm that is either a feature based algorithm or a hierarchical bounding volume algorithm.

13. The method according to claim 9, further comprising implementing a configurable penetration index to determine which electronic components are allowed to interact freely without evoking collision, and what penetration depth is allowed between meshed surfaces of electronic components before collision detection is triggered.

14. The method according to claim 9, wherein:
   if there is a detected collision, then reapplying the elements of the 3D working model and re-performing the collision check; and
   if there is no detected collision, then positioning the electronics faceplate and performing a subsequent collision check.

15. The method according to claim 9, further comprising providing a visual indicator on a user interface device if a collision is present.

16. The method according to claim 1, further comprising: storing a completed design with no collisions amongst its elements in the database.

17. The method according to claim 1, further comprising: acquiring definitive features in real time; and
   utilizing these features to define corresponding datum planes.

18. A computer system for automatically positioning a faceplate assembly on a hearing instrument shell, comprising:
   a processor for executing software algorithms;
   an input and an output associated with the processor;
   a user interface device for accessing the processor;
   a memory for storing the software algorithms;
   wherein the software algorithms comprise:
   an algorithm for automatically determining at least one anatomical feature of the hearing instrument shell based on a 3-D data representation of the shell, the anatomical feature being selected from the group consisting of a tragus, an anti-tragus, a crux, and a helix;
   an algorithm for automatically determining a position of the faceplate assembly on an outer surface of the hearing aid shell based on the at least one anatomical feature;
   an algorithm for ensuring that the position of the faceplate assembly does not cause a collision (collision detection) with the hearing instrument shell or other hearing aid components; and
   an algorithm for outputting the position of the faceplate assembly at an output of a computer.

19. A computer readable non-transitory media comprising software algorithms of computer-readable code that can be executed on a processor, the algorithms comprising:
   an algorithm for automatically determining at least one anatomical feature of the hearing instrument shell based on a 3-D data representation of the shelf, the anatomical feature being selected from the group consisting of a tragus, an anti-tragus, a crux, and a helix;
   an algorithm for automatically determining a position of the faceplate assembly on an outer surface of the hearing aid shell based on the at least one anatomical feature;
   an algorithm for ensuring that the position of the faceplate assembly does not cause a collision (collision detection) with the hearing instrument shell or other hearing aid components; and
   an algorithm for outputting the position of the faceplate assembly at an output of a computer.

* * * * *